United States Patent [19]

Brugger

[11] Patent Number: 4,579,473
[45] Date of Patent: Apr. 1, 1986

[54] PIVOT MECHANISM FOR TELEVISION RECEIVER CABINET

[75] Inventor: Kurt Brugger, Kodak, Tenn.

[73] Assignee: North American Philips Consumer Electronics Corp., New York, N.Y.

[21] Appl. No.: 566,100

[22] Filed: Dec. 27, 1983

[51] Int. Cl.[4] .............................................. F16C 11/00
[52] U.S. Cl. ................................... 403/163; 403/164; 403/71; 403/407.1; 24/453; 24/297; 24/625; 248/349; 411/41
[58] Field of Search ................... 403/71, 78, 164, 163, 403/165, 405, 407, 119; 248/349, 186; 24/453, 297, 625, 623, 662, 681; 411/40, 41, 57, 60; 358/254; 299/92

[56] References Cited

U.S. PATENT DOCUMENTS

| | | | |
|---|---|---|---|
| 2,935,288 | 5/1960 | Summerer | 248/349 |
| 3,078,064 | 2/1963 | Turnbull | 411/41 |
| 3,131,980 | 5/1964 | Barney | 248/349 |
| 3,865,437 | 2/1975 | Crosby | 403/165 |
| 4,276,806 | 7/1981 | Morel | 411/41 |
| 4,309,121 | 1/1982 | Salame | 403/164 |
| 4,401,287 | 8/1983 | Moeser | 248/349 |

FOREIGN PATENT DOCUMENTS 2850422  8/1983  Fed. Rep. of Germany .

Primary Examiner—Cornelius J. Husar
Assistant Examiner—Todd G. Williams
Attorney, Agent, or Firm—Thomas A. Briody; William J. Streeter; Marianne Rich

[57] ABSTRACT

A pivot mechanism for pivotably mounting a television receiver cabinet on a swivel base includes a molded pivot socket and a molded pivot pin. The pivot socket includes deformable tabs for locking engagement within an aperture in the swivel base. The pivot pin extends through an aperture in the receiver cabinet and includes deformable tabs for locking engagement with the pivot socket.

6 Claims, 6 Drawing Figures

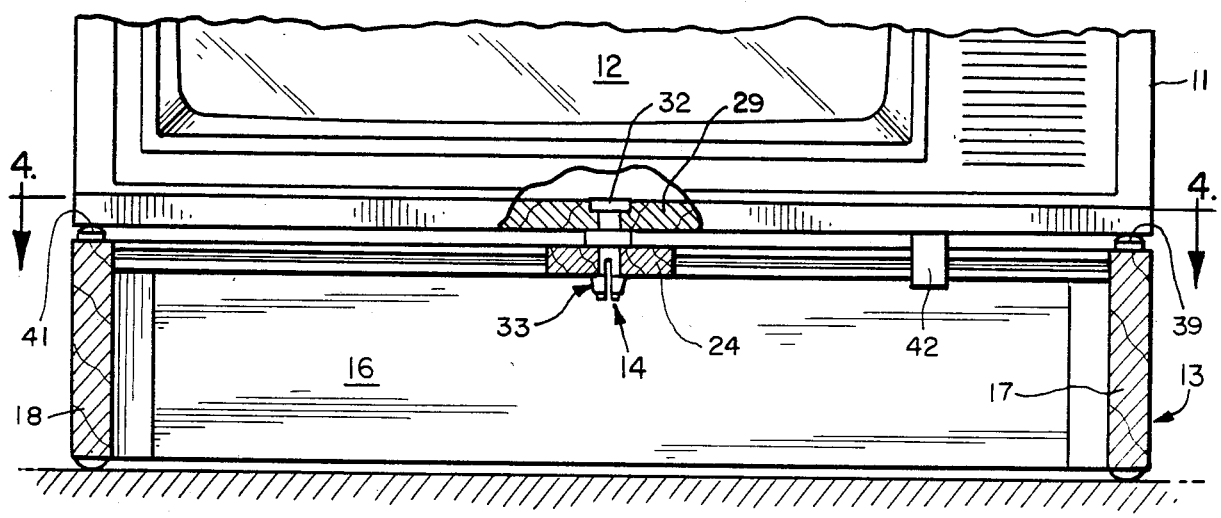
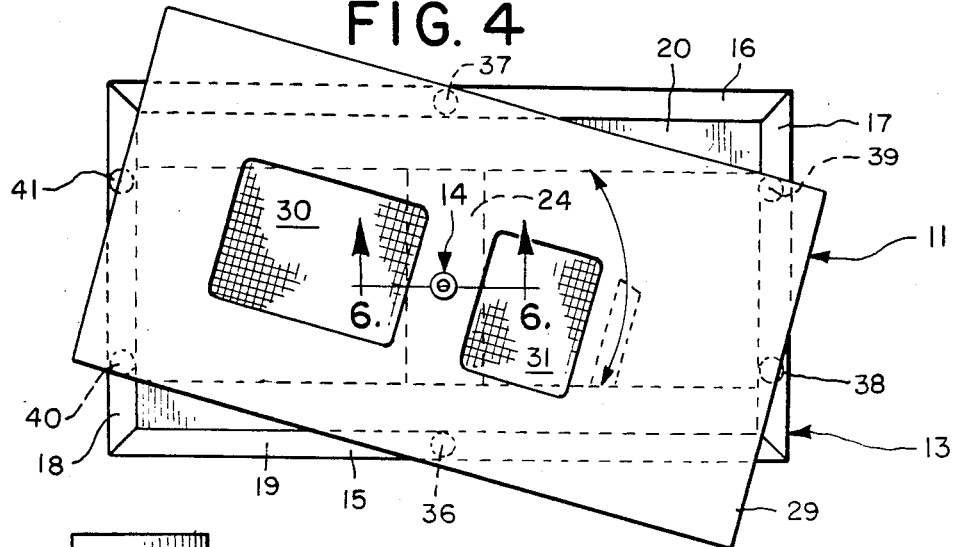
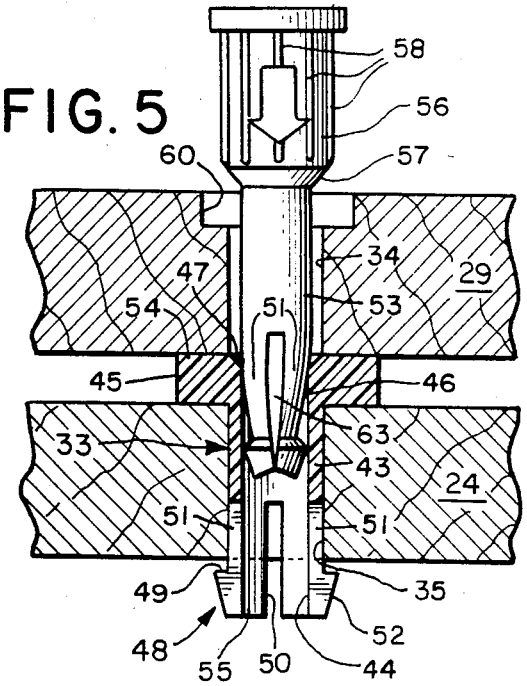
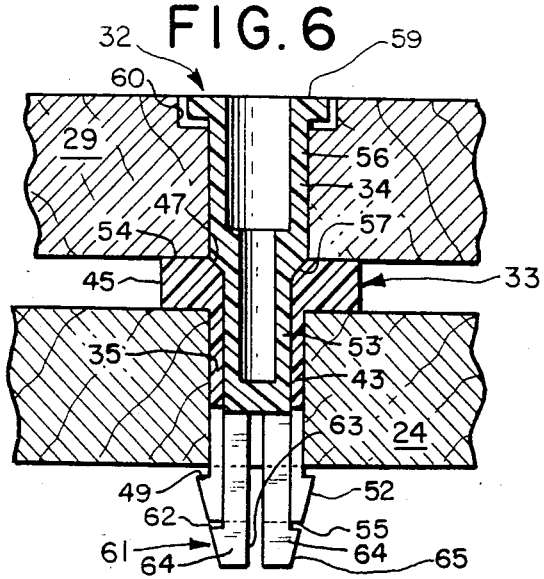

PIVOT MECHANISM FOR TELEVISION RECEIVER CABINET

BACKGROUND OF THE INVENTION

The present invention relates generally to pivot mechanisms, and in particular to a pivot mechanism for a television receiver console of the type having a swivel base and a pivotally mounted television receiver cabinet.

Television receiver consoles are frequently provided with swivel base assemblies which permit a viewer to position the screen of the receiver for maximum viewing comfort. To allow such swivel action pivot mechanisms are provided between the television cabinet and the base assembly.

Prior pivot mechanisms suffered the disadvantage of being undesirably expensive, not only in terms of the material cost of the mechanisms themselves, but also in terms of the time required to assemble and install such mechanisms during production. For example, in one prior pivot mechanism, a hex-head bolt, extending through apertures provided in the television cabinet and the base assembly, included a pair of nuts threaded onto one end for rotatably affixing the television cabinet to the base. Flat washers were provided under both the bolt head and the nuts to prevent the bolt from pulling through either the cabinet or the base, and a lockwasher was provided between the nuts to prevent the nuts from working loose.

Since this construction utilized electrically conductive metallic hardware, it was necessary to use insulating paper in the vicinity of the pivot mechanism to preclude the possibility of electrical short circuits. Furthermore, since assembly and installation of the mechanism required that the receiver cabinet be turned upside down, additional labor was required when this mechanism was used.

The present invention overcomes the disadvantages of prior systems by requiring the use of only two easily and inexpensively manufactured components. Basically, the base assembly is provided with an insulating, single-piece socket, while the television cabinet is provided with a pivot pin adapted to engage and rotatably interlock with the socket. Since each of the components can be easily and inexpensively manufactured in high volume from injection molded plastic, material costs are extremely low, and the use of such insulating material eliminates the need for additional insulating measures. A further advantage of the present invention is that the pivot mechanism is easily installed and assembled. Finally, because of the synthetic materials used in the pivot assembly, increased smoothness and improved swivel action are provided.

SUMMARY OF THE INVENTION

A pivot mechanism for rotatably attaching a first member to a second member includes a socket affixed to the first member and having a aperture therethrough. A generally cylindrical pivot pin, affixed to the second member, includes a cylindrical portion dimensioned to be received in the aperture in the socket. The cylindrical portion has a flange at one end thereof which limits travel of the pivot pin in one direction through the aperture. A deformable retainer at the other end of the cylindrical portion limits travel of the pivot pin in the other direction through the aperture. The deformable retainer normally has a dimension greater than the diameter of the aperture, and is inwardly deformable to a dimension less than the diameter of the aperture whereby the pivot pin can be inserted in the socket by inwardly deforming the enlarged region.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, in the several figures of which like reference numerals identify like elements, and in which:

FIG. 3 is a cross-sectional view of the television console shown in FIG. 2 taken along line 3—3 thereof.

FIG. 4 is a cross-sectional view of the television console shown in FIG. 3 taken along line 4—4 thereof.

FIG. 5 is a cross-sectional view of a pivot mechanism, constructed in accordance with the invention, illustrating the pivot mechanism during assembly thereof.

FIG. 6 is a cross-sectional view, similar to FIG. 5, illustrating a fully assembled pivot mechanism constructed in accordance with the invention.

DESCRIPTION OF THE PREFERRED EMBODIMENT

Figures 1, 2:
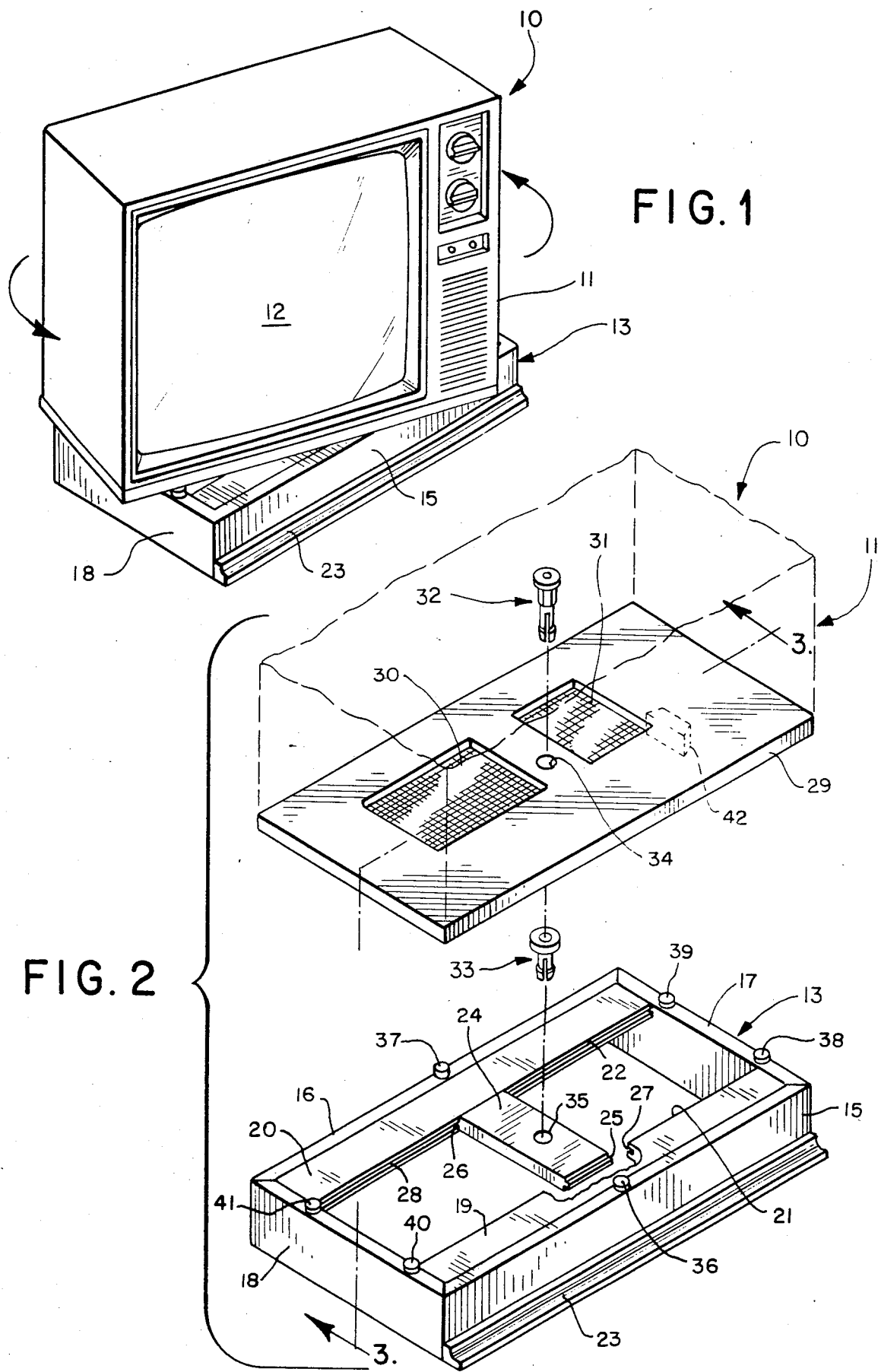
FIG. 1 is a perspective view of a television console incorporating a pivot mechanism constructed in accordance with the invention.
FIG. 2 is an exploded fragmentary perspective view, partially in section, of the television console illustrated in FIG. 1 illustrating the principal components thereof.

Referring to the Figures, and in particular to FIG. 1, a television receiver console 10 incorporating a pivot mechanism constructed in accordance with the invention is illustrated. The console 10 includes a receiver cabinet 11 for housing the receiver circuitry and includes a screen 12 for displaying television programs. To permit viewers to position screen 12 for comfortable viewing, the receiver cabinet is rotatably mounted to a swivel base assembly 13 by means of a pivot mechanism 14 (FIG. 3) constructed in accordance with the invention. As illustrated, the swivel base 13 is of generally the same rectangular dimension as the receiver cabinet 11 and is positioned immediately thereunder.

FIG. 2 illustrates in greater detail the construction of the swivel base assembly 13. Referring to that Figure, the swivel base includes vertically disposed front and rear pieces 15 and 16, fashioned from wood or similar material, joined to and separated by vertical wooden end pieces 17 and 18. Right angle joints are provided at each juncture of the pieces to form the rectangular structure as shown. To stiffen and strengthen the structure, the swivel base 13 includes a pair of relatively narrow horizontally oriented wooden bracing members 19 and 20 extending between end pieces 17 and 18 adjacent and parallel with the upper edges of front and rear pieces 15 and 16. As illustrated, a gap is formed between the interior vertical edges 21 and 22 of the bracing members. Ornamental molding 23, affixed along the lower exterior edge of front piece 15 contributes to the aesthetic appeal of the swivel base.

As is further illustrated in FIG. 2, a horizontal crosspiece 24 extends between bracing members 19 and 20 midway between end pieces 17 and 18 and is fastened to members 19 and 20 by means of tongues 25 and 26 which are received within grooves 27 and 28 provided in edges 21 and 22 of the bracing members.

Referring further to FIG. 2, the television receiver cabinet 11 includes a generally rectangular lower cabinet panel 29 fashioned from particle board or similar durable insulating material, and has rectangular dimensions similar to those of the swivel base 13. Cabinet panel 29 includes a pair of generally rectangular screen covered openings 30 and 31 which together provide ventilation and cooling for the television receiver circuitry.

In order to rotatably attach the receiver cabinet 11 to the swivel base 13, the television receiver console 10 includes the pivot assembly 14 which generally comprises a pivot pin 32 and a pivot socket 33. As shown in FIG. 2, pivot pin 32 is inserted through an aperture 34 provided through lower cabinet panel 29, while socket 33 is received in an aperture 35 provided through cross-piece 24 and colinearly aligned with aperture 34 when the receiver cabinet 11 is in its normal operating position over swivel base 13. When thus installed, pivot pin 32 interlocks with pivot socket 33 in the manner illustrated in FIG. 3, thereby permitting the receiver cabinet 11 to rotate relative to the swivel base 13.

To provide additional support to the receiver cabinet, the upper edges of members 15-18 are provided with a plurality of glide buttons 36-41, fashioned from Nylon, Teflon or similar such material, which contact the under surface of lower cabinet panel 29. As is further illustrated in FIG. 3, the upper surface of each glide button is slightly domed, thereby permitting the lower cabinet panel to easily slide relative thereto when cabinet 11 is rotated relative to base 13.

FIG. 4 shows the arrangement of the glide buttons in one particular unit. As shown, the six glide buttons 36-41 together support the receiver cabinet 11. Single glide buttons 36-37 are provided on the upper edges of front and rear pieces 15 and 16 midway between their ends, while end pieces 17 and 18 include glide buttons 38, 39 and 40,41 respectively along their upper edges. When arranged in this manner, the receiver cabinet 11 may rotate with respect to the swivel base 13 while still maintaining contact between the lower cabinet panel 29 and each of the glide buttons 36-41.

By reference to FIG. 4, it will be observed that continued rotation of the receiver cabinet 11 relative to the base 13 will eventually cause the lower cabinet panel 29 to disengage at least some of the glide buttons. Accordingly, means are provided for limiting rotation of the receiver cabinet with respect to the swivel base in order that contact with each of the glide buttons is maintained at all times. To this end, the lower cabinet panel 29 is provided with a downwardly projecting stop member 42 attached thereto, the construction and operation of which may best be understood by reference to FIGS. 2-4. Stop member 42 comprises a generally rectangular block of durable insulating material having a trapezoidal cross-section as shown in FIG. 4. The block projects downwardly into the region bounded by the interior edges of end piece 17, cross piece 24, and edges 21 and 22 of bracing members 19 and 20. When thus mounted, rotation of the receiver cabinet 11 relative to the swivel base will eventually cause an edge of the stop member 42 to contact edge 21 or edge 22 of the bracing members, thereby preventing further rotation.

The construction and operation of the pivot assembly 14 can best be understood by reference to FIGS. 5 and 6. Basically, the pivot mechanism serves to rotatably couple a first member, such as the lower cabinet panel 29 of television receiver cabinet 11, to a second member, such as the cross piece 24 of swivel base 13. Additionally, once assembled, the pivot mechanism serves to prevent separation of the cabinet from the base.

Referring to FIG. 5, the pivot socket 33 includes a generally cylindrical hollow body 43 having an aperture 44 therethrough. The socket has a length sufficient to pass fully through cross piece 24, leaving one end projecting therebelow. At its other end, the hollow body is provided with a generally circular flange 45 of substantially greater diameter which limits downward travel of the socket 33 through cross piece aperture 35. An aperture 46 is provided through the flange equal in diameter and colinear with aperture 44 through the hollow interior portion of the body. Aperture 46 is flared where it joins the upper surface of flange 45 thereby forming an annular ramped surface 47 around the aperture which serves as a bearing surface for the pivot assembly. Typically, the aperture is flared so that the ramped surface 47 forms an angle of approximately 45° relative to the horizontal upper surface of the flange 45.

Referring further to FIG. 5, the lower end of the pivot socket 33 is provided with a retainer mechanism in the form of an enlarged segment 48 integrally formed on hollow body 43 where it projects through cross piece 24. As shown, the enlarged segment 48 projects beyond the outer surface of the hollow body 43 to form an annular horizontal ledge 49 immediately below the lower surface of the cross piece. Since the diameter of annular ledge 49 is greater than that of aperture 44 vertical movement of the socket through the crosspiece is limited. Thus when installed, flange 45 and ledge 49 cooperate to maintain the position of the socket relative to the cross piece.

In order to permit insertion of the pivot socket 33 in cross piece 24, the hollow body 43 is provided with a plurality of generally vertical parallel slots 50 extending through the sidewalls of the body along approximately the lower half thereof. In the embodiment shown, the slots are spaced at approxiamtely 90° intervals thereby forming four parallel, downwardly projecting, inwardly displaceable tabs 51. When fashioned in this manner, the tabs can be deflected inwardly, thereby allowing the effective diameter of the enlarged segment 48 to be reduced. Thus, when tabs 51 are so displaced, pivot socket 33 may be introduced into aperture 35 thereby facilitating installation of the socket on the cross piece. When fully inserted, the end of the socket emerges from the aperture allowing tabs 51 to automatically spring back to their original orientation, with the effect that withdrawal of the socket from the cross piece is prevented.

In order to facilitate mounting socket 33 to cross piece 24, the outer surface of enlarged segment 48 is downwardly tapered so that its diameter at its outermost end matches that of the hollow body 43, thereby forming a ramped surface 52. Thus, when the socket is pressed downwardly into aperture 35, ramped surface 52 automatically inwardly biases tabe 51 toward one another, thereby effectively reducing the outer diameter of the enlarged segment 48, and thus allowing the socket to be inserted into the cross piece. Such simple insertion of the socket significantly reduces assembly time and can advantageously be performed by automatic means.

FIGS. 5 and 6 also illustrate in detail the construction of the generally elongated pivot pin 32. Referring to those figures, pivot pin 32 is fashioned from the same material forming pivot socket 33, and is of generally cylindrical form. The pivot pin includes a central body portion 53 of circular cross section, having an outside diameter no greater than that of aperture 44 through pivot socket 33. Accordingly, when the body 53 can is received in the pivot socket it can freely rotate relative thereto. To reduce weight and conserve material, the pivot pin 32 can be hollow as shown. Body 53 has a length sufficient to allow it to be fully received within pivot socket 33 leaving portions projecting both above and below the upper and lower edges 54 and 55 of the pivot socket in the manner best seen in FIG. 6. At its upper end, the body 53 is flared to join an upper portion 56 of greater diameter than body 53 thereby forming a ramped surface 57 circumferentially around the pivot pin between the upper portion and the body. The dimensions are chosen so that the angle formed by ramped surface 57 matches that of ramped surface 47 in socket 33 so that when fully assembled, as shown in FIG. 6, the ramped surfaces engage one another. In operation, these ramped surfaces serve as the bearing surfaces which determine overall smoothness of operation of the pivot assembly. Accordingly, by assuring that these surfaces accurately and smoothly engage one another, a smoothly operating pivot assembly is provided.

For ease of installation, a press-fit is preferably provided between the pivot pin 32 and aperture 34 in lower cabinet panel 29. In this respect, the upper portion 56 may include a plurality of vertical, parallel, outwardly projecting ridges 58 integrally formed along the outer surface thereof which help to maintain the position of pivot pin 32 relative to the panel. In order to limit the downward travel of the pivot pin through the aperture 34 the pivot pin includes a circular flange 59, atop upper portion 56 which prevents the pivot pin from being pulled through the aperture. In order to provide a flush fit with the interior surface of cabinet panel 29, aperture 34 may be countersunk to form a recess 60 for receiving flange 59.

To prevent unintentional withdrawal of pivot pin 32 from socket 33 following assembly of the pivot mechanism, the lower end of pivot pin body 53 is provided with a snap retainer mechanism which operates in a manner similar to that included with the pivot socket. The projecting portion of the pivot pin is provied with a segment 61 of relatively greater diameter than the body thereby forming a horizontally disposed annular ledge 62 around the body immediately beneath the lowermost edge 55 of the pivot socket. Because of the greater diameter of segment 61, once installed, upward travel of the pivot pin through the pivot socket is restricted.

In order to allow the pivot pin to be inserted into the pivot socket, the pivot pin body 53 is provided with a plurality of parallel, vertically disposed grooves 63, each of a depth sufficient to meet at the center of the body. In the embodiment shown, the pivot pin is provided with four such grooves spaced at 90° intervals thereby forming four parallel spaced tabs 64 which are displaceble toward one another to reduce the effective outer diameter of segment 61, thereby permitting the pivot pin to be inserted through aperture 44 in pivot socket 33 in the manner best illustrated in FIG. 5. To facilitate such insertion of the pivot pin into the pivot socket, the outer surface of segment 61 is downwardly tapered as shown thereby forming a ramped surface 65 which, when pressed into aperture 44 of the socket, causes tabs 64 to be displaced toward one another thereby permitting the pivot pin to pass through the pivot socket. When the pivot pin has been fully inserted into the socket, segment 61 protrudes fully from the bottom of the socket thereby enabling the tabs to once again resume their normal position, with the effect that inadvertent withdrawal of the pivot pin from the socket is prevented.

Once the pivot pin 32 has been installed within aperture 34 of the lower cabinet panel 29, it is a relatively simple operation to place the receiver cabinet 11 on to the swivel base 13, so that the pivot pin and socket interlock as shown in FIG. 3, thereby semi-permanently affixing the television cabinet to the swivel base. Should it be necessary to remove the cabinet from the swivel base, a special tool, in the form of a suitably dimensioned cylindrical collar (not shown) may be pressed against the ramped surface 65 in order to displace tabs 64 toward one another thereby permitting the pivot pin to be withdrawn from the pivot socket.

It will be apparent from FIG. 6 that the pivot assembly must be capable of withstanding downwardly directed forced applied to the pivot pin by reason of the weight of the television receiver cbinet. In order to reduce such downward forces exerted on the pivot pin assembly, the glide buttons 36–41 have vertical dimensions sufficient to assure that they each support a proportionate fraction of the weight of the receiver. In this regard, the vertical thickness of flange 45 is no more than the vertical separation between the receiver cabinet 11 and the upper surface of cross-piece 24 when the receiver cabinet rests on the glide buttoms.

By way of example, in one embodiment of the pivot mechanism, the pivot socket has a total length of 1¼ inches, an upper flange diameter of 1 inch and a flange thickness of ¼ inch. At the lower end of the pivot socket, the external diameter of the hollow body is approximately ½ inch, the width of each slot 50 is 1/16 inch, the maximum diameter of the enlarged segment is ⅝ inch and accordingly, ledge 49 has a width of 1/16 inch. The ledge is positioned 13/16 inch below the lower surface of the flange thereby permitting the pivot socket to be installed in a ¾ inch panel having a nominal ½ inch diameter aperture provided therethrough.

In the same example, the pivot pin has a total length of 2½ inches, while the diameter of the main body 53 is ⅜ inch. The annular ledge 62 formed at the lower end of body 53 is approximately 1/16 inch wide and the distance between the ledge and the lowermost edge of ramped surface 65 is 15/16 inches. The length of upper portion 56 is ⅝ inch while the thickness of flange 59 is ⅛ inch. Accordingly, the pivot pin may easily be installed in a receiver cabinet having a thickness of ¾ inches.

While the pivot mechanism has been shown in conjunction with a television console having a swivel base, it will be apparent that the mechanism may be adapted to other applications in which it is desired to semi-permanently pivotally attach one object to another in an uncomplicated and economical manner. It will also be appreciated that the dimensions of both the pivot pin and the pivot socket may be varied as necessary to suit the thickness of the members to be joined. Finally, the dimensions of the pivot pin and pivot socket may be adjusted as necessary to suit a variety of pivotal attaching applications. Furthermore, the number of grooves provided in the lower region of both the pivot socket and the pivot pin are not critical, the only requirement being that the end of each of these members is sufficiently displaceable as to allow the end to pass through the appropriate apertures during assembly.

While a particular embodiment of the invention has been shown and described, it will be obvious to those skilled in the art that changes and modifications may be made therein without departing from the invention in its broader aspects, and, therefore, the aim in the appended claims is to cover all such changes and modifications as fall within the true spirit and scope of the invention.

I claim:

1. A pivot mechanism for rotatably attaching a first member having a top surface, a bottom surface at a first predetermined distance from said top surface, and a first aperture passing therethrough, to a second member having a top surface, a bottom surface at a second predetermined distance therefrom and a second aperture passing therethrough, comprising a socket having a hollow cylindrical socket body defining a socket aperture received in said first aperture and having a length at least equal to said first predetermined distance, deformable socket retaining means formed at a first extremity thereof and extending over part of said bottom surface of said first member for preventing withdrawal of said socket from said first member in an upward direction and a socket flange formed at a second extremity thereof and extending over said top surface of said first member for preventing movement of said socket in a downward direction, said flange having a ramped surface; and a generally cylindrical pivot pin passing through said second aperture and said socket aperture, and rotatable relative to said firt member, and having a flange at one end thereof extending over said top surface of said second member, a pivot ramped surface for bearing against said socket ramped surface during rotation of said second member relative to said first member, and deformable pivot retaining means at the other end thereof for limiting travel of said pivot pin in the upward direction, said retaining means normally having a retaining diameter exceeding the diameter of said socket aperture, and extending below said deformable socket retaining means, said pivot pin retaining means being inwardly deformable to a dimension less than said diameter of said socket aperture.

2. A pivot mechanism as claimed in claim 1, wherein said first member is a base and said top surface is a planar surface;

wherein said second member is a cabinet, having a planar bottom surface;

wherein said first member has a plurality of glide buttons affixed to the edge thereof, said glide buttons separating said second member from said first member by a predetermined separation distance; and wherein said socket flange has a maximum height not exceeding said separation distance.

3. A pivot mechanism as defined in claim 1 wherein said deformable pivot retaining means include one or more slots formed therein thereby forming a plurality of inwardly displaceable tabs at said other end of said cylindrical portion.

4. A pivot mechanism as defined in claim 3 wherein said region of relatively larger diameter forms an annular ledge where it joins said cylindrical portion, said annular ledge encircling said cylindrical portion and forming a flat surface substantially perpendicular to the longitudinal axis of said cylindrical portion.

5. A pivot mechanism as defined in claim 4 wherein said region of relatively larger diameter is inwardly tapered in the direction away from said one end of said cylindrical portion, whereby said region can be pressed into said aperture to inwardly displace said displaceable tabs.

6. A pivot mechanism as defined in claim 5 wherein said deformable retaining means include four slots spaced at 90° intervals around said cylindrical portion thereby forming four displaceable tabs in said other end of said cylindrical portion.

* * * * *